(12) United States Patent
Shu et al.

(10) Patent No.: US 9,945,008 B2
(45) Date of Patent: Apr. 17, 2018

(54) TREATMENT METHOD OF CHLORINE-CONTAINING ZINC OXIDE SECONDARY MATERIAL

(71) Applicant: YUNNAN XIANGYUNFEILONG RESOURCES RECYCLING TECHNOLOGY CO., LTD., Yunnan (CN)

(72) Inventors: Yuzhang Shu, Yunnan (CN); Qi Zhang, Yunnan (CN); Guifen Yang, Yunnan (CN); Baohua Sun, Yunnan (CN); Linkui Wei, Yunnan (CN)

(73) Assignee: YUNNAN XIANGYUNFEILONG RESOURCES RECYCLING TECHNOLOGY CO., LTD., Yunnan (CN)

( * ) Notice: Subject to any disclaimer, the term of this patent is extended or adjusted under 35 U.S.C. 154(b) by 95 days.

(21) Appl. No.: 14/907,579

(22) PCT Filed: Jul. 3, 2014

(86) PCT No.: PCT/CN2014/081557
§ 371 (c)(1),
(2) Date: Jan. 26, 2016

(87) PCT Pub. No.: WO2016/000231
PCT Pub. Date: Jan. 7, 2016

(65) Prior Publication Data
US 2016/0160319 A1 Jun. 9, 2016

(51) Int. Cl.
*C22B 26/00* (2006.01)
*C22B 26/10* (2006.01)
(Continued)

(52) U.S. Cl.
CPC .............. *C22B 26/10* (2013.01); *C22B 3/005* (2013.01); *C22B 7/007* (2013.01); *C22B 19/22* (2013.01);
(Continued)

(58) Field of Classification Search
CPC ......... C22B 26/10; C22B 19/22; C22B 7/007; C25C 1/16
(Continued)

(56) References Cited

FOREIGN PATENT DOCUMENTS

CN 102808087 A 12/2012

OTHER PUBLICATIONS

Machine translation of CN-102808087, Dec. 2012.*
International Search Report of PCT Patent Application No. PCT/CN2014/081557 dated Mar. 27, 2015.

* cited by examiner

*Primary Examiner* — Steven J Bos

(57) ABSTRACT

The invention discloses a treatment method of a chlorine-containing zinc oxide secondary material, which comprises the following steps: 1) leaching the chlorine-containing zinc oxide secondary material I through an acid solution; 2) selectively extracting zinc through di-(2-ethylhexyl)phosphoric acid (P204)-kerosene solvent; 3) implementing stripping-electrolysis zinc recovery; 4) repeating steps 1)-4); 5) taking out the raffinate obtained from the Step (4), mixing the residual taken out raffinate with chlorine-containing zinc oxide secondary material II when balance on chlorine ion input and taking out is achieved; carrying out liquid-solid separation; leaching the separated deposit through acid raffinate of the step 1); 6) after separated solution achieves preset conditions, purifying the chlorine-containing aqueous phase; 7) evaporating and concentrating to crystallize out KCl and NaCl products. The invention is environment-friendly and energy-saving, and free from process wastewa- (Continued)

ter emission; production cost is greatly reduced and secondary pollution of the current dechloridation process is eliminated thoroughly.

7 Claims, 1 Drawing Sheet

(51) Int. Cl.
    *C22B 19/30*     (2006.01)
    *C22B 7/00*     (2006.01)
    *C22B 3/00*     (2006.01)
    *C25C 1/16*     (2006.01)
    *C22B 3/38*     (2006.01)

(52) U.S. Cl.
    CPC ................ *C22B 19/30* (2013.01); *C25C 1/16* (2013.01); *Y02P 10/234* (2015.11)

(58) Field of Classification Search
    USPC ........................... 423/99, 109; 205/305, 311
    See application file for complete search history.

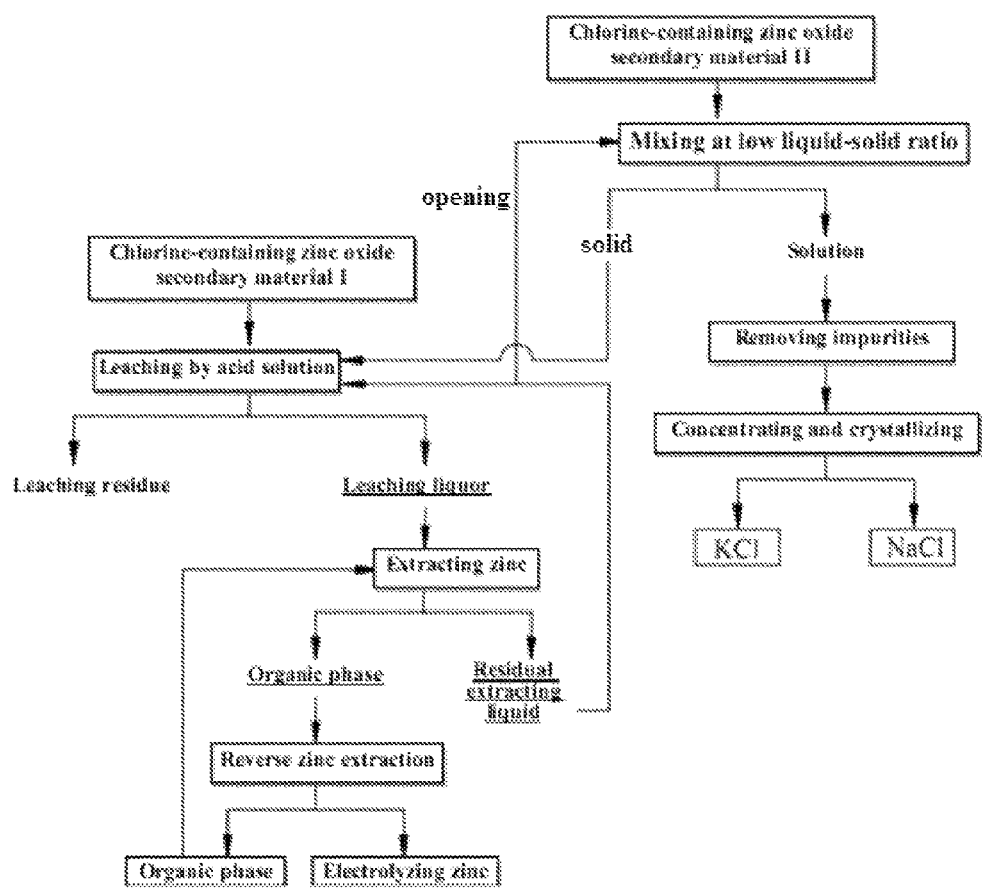

TREATMENT METHOD OF CHLORINE-CONTAINING ZINC OXIDE SECONDARY MATERIAL

FIELD OF THE TECHNOLOGY

The invention belongs to the field of integrated recovery of a zinc-containing secondary resource, and in particular relates to a treatment method of a chlorine-containing zinc oxide secondary material.

BACKGROUND

At present, about 14,000,000 tons of zinc ingots are consumed in the world annually, wherein 50% of the zinc ingots are used for surface protection of steel. In the recovery of galvanized steels, zinc is volatilized at high temperature and incorporated into steelmaking dust, and this kind of dust is called electric arc furnace dust (EAFD). In addition, zinc is also associated with various metal mineral resources, and the zinc is also incorporated into the smelting dust during a process of smelting those metals at high temperature. In some zinc-containing wastes, lead and zinc are volatilized and incorporated into the dust through a high-temperature reduction volatilization. These kinds of dust are the main source of secondary zinc resources. These zinc-containing materials are common in that zinc exists in the form of oxide. Meanwhile, these zinc-containing materials are different in terms of chlorine content, which exceeds the maximum amount allowed by conventional zinc hydrometallurgy by tens folds to hundreds folds, and these zinc-containing materials contain lead, calcium, magnesium, iron, sodium, potassium, silicon dioxide, etc. When being treated by current zinc hydrometallurgy technology, chlorine enters into the solution which prevents the electrolysis process of the zinc from occurring. Mineral zinc raw materials are growing increasingly tense and running out around the world, while the amount of secondary zinc resources has been increasing, and accumulation of the secondary zinc resources has caused increasing pressure on the environment. Therefore, people are urged to conduct a lot of researches on utilization of the secondary resources.

High chlorine content is a key factor as to why the current zinc smelting technology is unavailable to the treatment of the secondary resources. In order to adapt the raw material to the technological requirements of zinc hydrometallurgy, current researches mainly focus on removal of chlorine in the raw materials. According to a concept of the existing treatment, chlorine of the materials is removed, and the current zinc smelting technology is employed after reducing the chlorine content.

Chlorine is removed from the chlorine-containing zinc oxide through pyrogenic dechlorination and wet dechlorination processes, respectively. The pyrogenic dechlorination relies on the basis that metal chloride has a higher vapor pressure at high temperature and has a property of being easily volatilized, hence chlorine is removed and volatilized in the form of metal chloride at high temperature. Generally, such dechlorinating equipment includes multi-hearth furnace and waelz kiln. Some people have also studied the use of microwave in dechlorination, which heats the materials to 700-1100° C. to volatilize the chlorine. The pyrogenic dechlorination has shortcomings such as high energy consumption, low metal recovery rate, creation of a gas-phase pollution source, and imposing pressure on the environment due to generation of dust with even higher chlorine content. However, the pyrogenic dechlorination is still widely adopted by various enterprises at present. After removing the chlorine, the zinc oxide is applied to the existing zinc smelting process.

The wet dechlorination relies on the property of chloride being soluble in water, hence chlorine is transferred to solution. Generally, sodium carbonate (or ammonium carbonate) is used for treating the materials, converting lead chloride and zinc chloride into carbonate which is insoluble in water, while the chlorine enters into the solution in the form of sodium chloride. The wet dechloridation has the shortcomings of incomplete dechlorination, high reagent consumption, high cost, high water consumption for the dechlorination, and the dechlorinated liquid being a mixed dilute solution of sodium (potassium) chloride, sodium carbonate and sodium (potassium) sulfate. The dechlorinated solution, which is non-recyclable and it is inconvenient to recover the chloride salts, is generally discharged. Therefore, a large amount of chlorine-containing wastewater discharge is associated with the wet dechlorination.

Despite the various disadvantages, the process of removing chlorine from the raw materials is still a process of choice to treat chlorine-containing zinc oxide secondary resources at present. After removing the chlorine from the chlorine-containing zinc oxide it can be applied to the current zinc smelting process. Due to incomplete dechlorination of the raw materials, a certain amount of chlorine is still present in the raw materials and is constantly accumulated during the leaching-electrolysis cycle in the process of zinc hydrometallurgy. Therefore, the chlorine must in turn be removed from the circulating zinc sulfate solution. The chlorine in the zinc sulfate solution is removed on the basis that some oxides have low solubility in the zinc sulfate solution and form a chloride precipitate, which allows the chlorine to be removed from the solution. Generally, monovalent copper ions serve as a precipitant for precipitating chlorine ions. By precipitating the chlorine in the form of cuprous chloride, the chlorine content in the zinc sulfate solution can be reduced so that electrolysis can be implemented normally. Ion exchange, chlorine extraction using organic solvent, or other methods are also available to transfer chlorine in the zinc sulfate solution to other solutions and be discharged in the form of wastewater. Because of existence of the chlorine, the zinc hydrometallurgy process is complex and consumption of expensive copper is increased. Meanwhile, discharge of chlorine-containing wastewater is increased by a large amount.

Therefore, the problem of high chlorine content in the secondary zinc oxide is still a challenge in the zinc recycling field. Because such a problem cannot be solved thoroughly, secondary zinc oxide resources cannot be effectively utilized for a long time. Thus, utilization rate of secondary zinc resources is much lower than that of the other non-ferrous metals.

SUMMARY

The Technical Problem

Whereas, in order to solve the above challenges, the present invention aims to provide an environment-friendly and energy-saving technology for chlorine-containing zinc oxide secondary resources. The inventor has completed the invention on the basis of a lot of further studies and creative work.

Solution to the Problems

The technical solution adopted is:

A treatment method of chlorine-containing zinc oxide secondary material is characterized by the following steps:

(1) Leaching a chlorine-containing zinc oxide secondary material I with an acidic solution to obtain a leaching liquor and a leaching residue;

(2) Selectively extracting zinc from the leaching liquor obtained from the Step (1) with di-(2-ethylhexyl)phosphoric acid ($P_{204}$)-kerosene solvent to obtain a zinc-containing organic phase as well as a chlorine and acid containing raffinate;

(3) Recovering zinc from the zinc-containing organic phase obtained from the Step (2) by stripping-electrolysis, and returning the organic phase after the stripping to the Step (2) to extract zinc;

(4) Taking the raffinate obtained from the Step (2) as the acidic solution of the Step (1), returning to the Step (1) and repeating the Steps (1)-(4);

(5) Taking out the raffinate obtained from the Step (4) when chlorine ion of a chlorine-containing aqueous phase in the step (2) achieves 50-80 g/L after circulating and repeating the Steps (1)-(4), wherein the chlorine content of an amount of the raffinate taken out corresponds to chlorine content of the raw material added in the Step (1) so as to keep a balance between the chlorine ion added and the chlorine ion taken out; mixing the raffinate taken out with an additional chlorine-containing zinc oxide secondary material II at liquid-solid ratio of 1-3:1; carrying out liquid-solid separation; returning the separated deposit to the Step (1) for leaching with the acidic raffinate;

(6) After finishing the Step (5), the separated solution contains 80-120 g/L of chlorine ion and 160-240 g/L of total salt content, removing impurities of the chlorine-containing aqueous phase to obtain a mixed solution of KCl and NaCl;

(7) Evaporating and concentrating the mixed solution of KCl and NaCl obtained from the Step (6) to produce KCl and NaCl products by crystallization.

Preferably, in the Step (1), conditions of the leaching are as follows: liquid-solid ratio of the leaching liquor is controlled at 25-28 g/L of zinc. Depending on different zinc contents of the materials, the liquid-solid ratio is controlled at 20-40:1; the leaching is implemented in a mechanical stirring tank; and an end pH value of the leaching is 4.5-5.0.

Preferably, sulfuric acid serves as the acidic solution for primary leaching in the Step (1); the sulfuric acid shall be supplied if the acid from the raffinate of the Step (4) for the leaching in the Step (1) is insufficient.

Preferably, in the Step (2), the $P_{204}$—kerosene solvent is prepared by mixing a $P_{204}$ organic solvent and 260# kerosene solvent, and a volume percentage of the $P_{204}$ organic solvent falls within 20-40%.

Preferably, the recovery of zinc by the stripping-electrolysis in the Step (3) is carried out by stripping the zinc-containing organic phase with a zinc electrolysis waste solution, wherein the stripped solution contains 100-120 g/L of Zn and 60-100 g/L of $H_2SO_4$, and electrolyzing zinc after deoiling.

Preferably, the mixing in the Step (5) is carried out in a mechanical stirring tank or in a form of dump leaching; ore pulp shall be filtered to realize liquid-solid separation when the mixing is carried in the mechanical stirring tank.

Preferably, the impurity removal in the Step (6) comprises the following steps:
1) neutralizing and removing heavy metal: adding lime and controlling pH value at 7.0-7.5;
2) neutralizing and removing Mg: adding lime and controlling pH value at 10; 3) removing calcium: adding $Na_2CO_3$.

Advantageous Effects of the Present Invention

Advantageous Effects

The invention has the advantages as follows:

1. The Steps (1) to (7) of the present invention do not have a chlorine removal process, thus omitting the chlorine removal process of the raw materials, simplifying the process flow, eliminating the gaseous phase and aqueous phase pollution sources produced by the chlorine removal process of the raw materials, reducing energy consumption and reagent consumption in the chlorine removal process, and greatly reducing production cost.

2. According to the present invention, zinc is extracted and recovered using the organic solvent in the Step (2), impurities are removed in the Step (6), and chloride is recovered in the Step (7), thereby achieving a purpose of simultaneously implementing zinc recovery, chloride recovery and impurity removal.

3. According to the present invention, chlorine in the chlorine-containing zinc oxide is transferred to the solution through the Steps (1), (2), (3), (4) and (5) and is enriched as a high concentration chloride solution, so as to facilitate recovery of sodium chloride and potassium chloride from the solution.

4. According to the present invention, chloride salt is recovered in the Step (7), so as to recover the chlorine in the raw material as a product, which not only possesses a certain economic value but also thoroughly eliminates secondary pollution of the current dechlorination process.

5. The present invention is free from wastewater discharge by the process, thus the company can realize the goal of zero emission of wastewater.

6. According to the present invention, zinc oxide secondary materials having different chlorine contents, in which the chlorine content of the raw material is 1-20%, can be directly processed. Raw materials with slightly less chlorine content are directly leached according to the Step (1), and raw materials with higher chlorine content are used for treating raffinate according to the Step (5) and are leached according to the Step (1).

BRIEF DESCRIPTION OF THE DRAWINGS

Description of the Drawings

In order to clearly illustrate the technical solution of the embodiments of the invention or the existing technology, the drawings of the embodiments will be briefly described as follows. It is obvious that the described drawings are merely embodiments of the present invention. Those skilled in the art can obtain other drawings depending on those drawings, without any inventive work.

FIG. 1 is the process flowchart of the present invention.

DETAILED DESCRIPTION

Embodiments of the Present Invention

The technical solutions of the embodiments will be described in a clearly and fully understandable way in connection with drawings related to the embodiments of the present invention. It is obvious that the described embodiments are just the preferred embodiments but not all of the embodiments of the present invention. Based on the described embodiments therein, those skilled in the art can obtain other embodiment(s), without any inventive work, which should be within the scope of the present invention.

According to the process flowchart as shown in FIG. 1, a treatment method of a chlorine-containing zinc oxide secondary material includes the following steps:

(1) Leaching the chlorine-containing zinc oxide secondary material I with an acidic solution to obtain a leaching liquor and a leaching residue;

(2) Selectively extracting zinc from the leaching liquor obtained from the Step (1) with $P_{204}$-kerosene solvent to obtain a zinc-containing organic phase as well as a chlorine- and acid-containing raffinate;

(3) Recovering zinc from the zinc-containing organic phase obtained from the Step (2) by stripping-electrolysis; returning a lean organic phase after the stripping to the Step (2) for extraction of zinc;

(4) Taking the raffinate obtained from Step (2) as the acidic solution of Step (1); returning to the Step (1) and repeating the Steps (1)-(4);

(5) Circulating the chlorine- and acid-containing raffinate obtained from the Step (2) for multiple times until chlorine ion therein reaches 50-80 g/L; taking out a portion of the raffinate obtained from the Step (4), and mixing with additional chlorine-containing zinc oxide secondary material II at a low liquid-solid ratio; separating precipitate; and adding the chlorine-containing zinc oxide secondary material of the Step (1), wherein the amount of the raffinate taken out corresponds to the chlorine content of the raw material added in the Step (1) so as to keep a balance between the chlorine ion added and the chlorine ion taken out;

(6) When chlorine ion in a chlorine-containing aqueous phase obtained from the Step (5) reaches 80-120 g/L and a total salt content thereof reaches 160-240 g/L, removing impurities from the chlorine-containing aqueous phase to obtain a mixed solution of KCl and NaCl;

(7) Evaporating and concentrating the mixed solution of KCl and NaCl obtained from the Step (6) to produce KCl and NaCl products by crystallization.

Therefore, according to the process flow, an acidic wet treatment process of chlorine-containing zinc oxide (secondary material) is actually provided according to the present invention. Further description of the process flow will be provided below:

According to the present invention, instead of implementing dechlorination to the chlorine-containing zinc oxide (secondary material) in advance, the zinc oxide is directly leached using acidic solution, so that soluble materials such as zinc, chlorine, potassium, sodium and magnesium in the zinc oxide are leached into the solution. The zinc is selectively extracted with $P_{204}$ kerosene solvent so as to separate the zinc from $Cl^-$, $K^+$, $Na^+$, $Mg^{2+}$ and the like. By recovering zinc from zinc-containing organic phase by stripping-electrolysis, the raffinate is returned once again to the leached chlorine-containing zinc oxide. Repeating the cycle in such way allows $Cl^-$, $K^+$, $Na^+$, $Mg^{2+}$ and other ions in the solution to be continuously circulated and enriched, thus forming a complex mixed system of chlorine salt-sulfate salt mainly containing $Cl^-$ ion and simultaneously including $K^+$, $Na^+$, $Mg^{2+}$ and $Zn^{2+}$ as well as trace amount of sulfuric acid.

After $Cl^-$, $K^+$, $Na^+$ and $Mg^{2+}$ in the solution reach a certain concentration, a portion of zinc-extracted raffinate is taken out to recover chloride salts, thus realizing a balance between the input and output of $Cl^-$, $K^+$, $Na^+$, $Mg^{2+}$ and other ions.

The residual zinc raffinate taken out contains free acid in the same number of moles as that of the extracted zinc ion, and not-extracted zinc. The raffinate taken out is mixed with excessive chlorine-containing zinc oxide raw material at the low liquid-solid ratio. Acid in the solution is neutralized, zinc and sulfate radical are reduced, and chlorine ion concentration is further increased. The solution is neutralized by lime to remove $Mg^{2+}$ and trace amount of heavy metal ions. After being processed, the solution becomes a mixed high-concentration solution of KCl and NaCl. The solution is concentrated and crystallized to produce potassium chloride and sodium chloride products.

Furthermore, principles and characteristics of the process flow according to the present invention are described below, including preferred process conditions of the above steps (1)-(7). Equivalent or equal process conditions made by those skilled in the art according to the principles and characteristics below shall be included within the content scope and protection scope of the present invention.

The invention has the following characteristics:

1. Instead of Carrying Out Pyrogenic or Wet Dechlorination in Advance, Acidic Leaching is Directly Implemented on the High-Chlorine Zinc Oxide Raw Material.

$Cl^-$, $Zn^{2+}$, $Mg^{2+}$, $K^+$ and $Na^+$ in the raw material enter into the leaching liquor. Acid necessary for the leaching came from the circulating residual zinc raffinate, and the insufficient portion of acid is filled up by sulfuric acid. Pb and Ca in the raw material enter into the leaching residue in the form of sulfate and $SiO_2$, respectively. The sulfate radical in the solution will not be accumulated or enriched. The leaching residue serves as a source for recovering lead.

Preferably, leaching conditions are as follows: liquid-solid ratio of the leaching liquor is controlled at 25-28 g/L of zinc. Leaching is implemented in a mechanical stirring tank. The end pH value of the leaching is 4.5-5.0.

To improve the leaching rate of zinc, multi-stage countercurrent leaching which is generally adopted in zinc hydrometallurgy can be used.

Leaching Reactions:

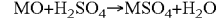
$$MO+H_2SO_4 \rightarrow MSO_4+H_2O$$

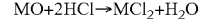
$$MO+2HCl \rightarrow MCl_2+H_2O$$

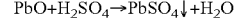
$$PbO+H_2SO_4 \rightarrow PbSO_4\downarrow +H_2O$$

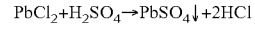
$$PbCl_2+H_2SO_4 \rightarrow PbSO_4\downarrow +2HCl$$

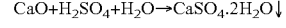
$$CaO+H_2SO_4+H_2O \rightarrow CaSO_4.2H_2O\downarrow$$

where M is Zn, Mg, etc., and KCl, NaCl as well as chlorides of Zn and Mg can be directly dissolved in the solution.

2. Zinc Recovery, and Chlorine Circulation & Enrichment

Leaching liquor is filtered to obtain a clear solution, and is mixed with $P_{204}$ organic solvent. Zinc is selectively extracted. Free acid at the same number of moles as that of the extracted zinc ion is generated when extracting the zinc. Other ions such as $Cl^-$, $SO_4^{2-}$, $K^+$, $Na^+$ and $Mg^{2+}$ are still remained in the solution. Zinc-extracted raffinate is returned and leached, so that ions such as $Cl^-$, $K^+$, $Na^+$ and $Mg^{2+}$ are circulated and accumulated in a process of leaching→zinc extraction→re-leaching. Reactions of the extraction of zinc are as follows:

$$ZnCl_2+3HR \rightarrow ZnR_2 \cdot HR+2HCl$$

$$ZnSO_4+3HR \rightarrow ZnR_2 \cdot HR+H_2SO_4$$

When extracting zinc, the $P_{204}$ organic solvent and 260# kerosene solvent are mixed such that the volume percentage of the $P_{204}$ organic solvent falls within 20%-40%, such as 20%, 25%, 30%, 35% or 40%.

The stripping is carried out on the organic phase for zinc extraction using zinc electrolysis waste liquid. The stripped solution contains Zn 100-120 g/L and $H_2SO_4$ 60-100 g/L, and zinc is electrolyzed after deoiling.

The solution is recycled repeatedly. Zinc is extracted with organic solvent for each cycle, while other soluble ions are accumulated in the circulating liquid, eventually forming a complex mixed system of chlorine salt-sulfate salt mainly containing $Cl^-$ ion and simultaneously including $SO_4^{2-}$, $Zn^{2+}$, $K^+$, $Na^+$, $Mg^{2+}$, etc. The zinc extraction system is different from the current widely-used zinc extraction system using sulfate, the two belonging to two different dissolution systems.

3. Control of Chlorine Ion

Through circulation of leaching→extraction→re-leaching, content of in the raw material is continuously increased in the circulating solution. After reaching a certain concentration (such as 50-80 g/L), a portion of chlorine-containing solution is taken out from the circulating liquid in accordance with the balance between $Cl^-$ input and output.

Specific treatment process adopts a portion of raffinate after extracting zinc. The raffinate is an acidic solution which contains acid in the same number of moles as that of the extracted zinc ion, while also contains different amounts of $SO_4^{2-}$ and $Zn^{2+}$, $K^+$, $Na^+$, $Mg^{2+}$, etc. The solution taken out is mixed with chlorine-containing zinc oxide raw material at a low liquid-solid ratio. During this process, acid in the solution is neutralized, and a portion of $Zn^{2+}$ is turned into alkaline zinc sulfate precipitate.

Neutralization Reaction of Acid:

$$ZnO+2HCl \rightarrow ZnCl_2+H_2O$$

$$ZnO+H_2SO_4 \rightarrow ZnSO_4+H_2O$$

Excessive ZnO will continue to react to generate alkaline zinc salt precipitate:

$$ZnSO_4+ZnO+H_2O \rightarrow 2Zn \cdot SO_4 \cdot (OH)_2 \downarrow$$

Meanwhile, chloride in the raw material is dissolved in the solution. The amount of chlorine ion in the solution is increased and the amount of chlorine in the raw material is reduced. After the chlorine content is reduced, the secondary zinc material is leached together with other chlorine-containing zinc oxide.

Treatment process of the raffinate taken out can be implemented in the mechanical stirring tank or in a form of dump leaching. Ore pulp shall be filtered to realize liquid-solid separation when the treatment process is carried in the mechanical stirring tank.

4. Recovery of KCl and NaCl from Chlorine-Containing Solution

Generally, solution treated by the above process can reach a chlorine content of 80-120 g/L and a total salt content of 160-240 g/L, being a high-concentration solution. The treated solution can serve as raw material for recovering KCl and NaCl, and is also a condition for judging the recovery.

After removal of the impurities, the solution becomes a mixed solution of KCl and NaCl. The mixed solution of KCl and NaCl is evaporated and concentrated to produce KCl and NaCl products by crystallization, respectively.

A preferable impurity removal process includes the follows: 1) neutralizing and removing heavy metal: adding lime and controlling the pH value at 7.0-7.5 to participate heavy metals in the solution such as $Zn^{2+}$ by forming hydroxide; 2) neutralizing and removing Mg: adding lime and controlling the pH value at 10 to participate Mg by forming hydroxide; 3) removing calcium: precipitating trace amount of $Ca^{2+}$ contained in the solution by forming $CaCO_3$, using $Na_2CO_3$. pH value of the solution is 10-11 after separating the precipitate, and the solution is concentrated and crystallized to produce KCl and NaCl.

The present invention is further described in the working example below:

Working Example

A certain chlorine-containing zinc oxide secondary material was taken as a reagent, wherein chemical components (in percentage by weight) are as follows:

TABLE 1

| | Zn | Pb | CaO | $SiO_2$ | Cl | MgO | K | Na |
|---|---|---|---|---|---|---|---|---|
| Chlorine-containing zinc oxide secondary material I % | 55 | 5 | 3 | 2 | 6.8 | 1.2 | 1.2 | 1.6 |
| Chlorine-containing zinc oxide secondary material II % | 28.7 | 15.50 | — | — | 20.2 | — | 9.55 | 7.39 |

After being repeatedly circulated and reaching the balance, the residual zinc raffinate contained the following components (Unit: g/L)

TABLE 2

| Cl− | K+ | Na+ | $Mg^{2+}$ | $Zn^{2+}$ | H+(mol/L) | $SO_4^{2-}$ |
|---|---|---|---|---|---|---|
| 67.2 | 10 | 15.6 | 10.1 | 13 | 0.40 | 32 |

Step (1): The residual zinc raffinate was leached to give 1500 g of chlorine-containing zinc oxide. Zinc content of the leaching liquor was controlled at 26 g/L. The liquid-solid ratio adopted was 42.21 L of residual zinc raffinate was added. $H_2SO_4$ was slowly added to control the end pH value of the leaching at 5.0 to obtain a leaching liquor which contains the following components: (unit: g/L)

TABLE 3

| $Zn^{2+}$ | $Cl^-$ | $K^+$ | $Na^+$ | $Mg^{2+}$ | $SO_4^{2-}$ |
|---|---|---|---|---|---|
| 26 | 68.8 | 10.2 | 15.8 | 10.3 | 32.5 |

Step (2): Clear leaching liquid was filtered. Zinc was extracted with 30% of $P_{204}$-260# solvent oil. Phase ratio was at 1:1 and extracting level was on IV-level. The raffinate was obtained which contained 13 g/L of Zn and 0.4 mol/L of $H^+$.

Step (3): Zinc was stripped from organic phase for zinc extraction using zinc electrolysis waste liquid, wherein the solution after stripping contained 110 g/L of Zn and 85 g/L of $H_2SO_4$. Zinc was electrolyzed after deoiling.

Step (4): 34 g of chlorine was added in accordance with the Step (1). 500 ml of residual zinc raffinate (containing 34 g of chlorine) in the Step (2) was taken out, and 20.5 L remained. The volume was topped up to 21 L and returned to the Step (1) for leaching. The steps were repeated.

Step (5): The 500 ml of raffinate taken out was mixed with 200 g of chlorine-containing zinc oxide secondary material II at a liquid-solid ratio of 2.5:1 and stirred for 30 min. The mixed solution was filtered to obtain 500 ml of solution which contained the following components: (unit: g/L)

TABLE 4

| $Zn^{2+}$ | $Cl^-$ | $K^+$ | $Na^+$ | $Mg^{2+}$ | $SO_4^{2-}$ | PH |
|---|---|---|---|---|---|---|
| 8 | 132.8 | 40.7 | 39.2 | 10.5 | 5.3 | 6.0 |

Concentration of $Cl^-$, $K^+$ and $Na^+$ ions in the solution were increased while $Zn^{2+}$ and $SO_4^{2-}$ were reduced. The total salt content of the solution was 235.7 g/L. Precipitate weighed 190 g after filtering and separating, which contained 315% of Zn. Cl content was reduced from 20.02% to 4.6%. It was returned to the Step (1) for leaching.

Step (6): Chlorine ion of chlorine-containing aqueous phase reached 1320, after the Step (5). Impurities were removed from the chlorine-containing aqueous phase to obtain a mixed solution of KCl and NaCl, wherein the impurity removal process included the follows: 1) neutralizing and removing heavy metal: adding lime and controlling the pH value at 7.0-7.5 to participate heavy metals such as $Zn^{2+}$ by finning hydroxide; 2) neutralizing and removing Mg: adding lime and controlling the pH value at 10 to participate Mg by forming hydroxide; 3) removing calcium: precipitating trace amount of $Ca^{2+}$ contained in the solution by forming $CaCO_3$ using $Na_2CO_3$.

Step (7): The mixed solution of KCl and NaCl obtained from the Step (6) was evaporated and concentrated to produce KCl and NaCl products by crystallization, wherein pH value of the mixing solution was 10-11.

The foregoing merely describes exemplary embodiments of the present invention, and is not intended to restrict the scope of the present invention. Any modification, equivalent replacement, improvement, etc. within the gist and principle of the present invention shall be included in the protection scope of the present invention.

What is claimed is:

1. A treatment method of a chlorine-containing zinc oxide secondary material, wherein, the method comprises the following steps:
   (1) leaching a chlorine-containing zinc oxide secondary material I with an acidic solution to obtain a leaching liquor and a leaching residue;
   (2) selectively extracting zinc from the leaching liquor obtained from step (1) with a di-(2-ethylhexyl)phosphoric acid—kerosene solvent to obtain a zinc-containing organic phase as well as a chlorine and acid containing raffinate;
   (3) recovering zinc from the zinc-containing organic phase obtained from step (2) by stripping and electrolysis and returning the organic phase after the stripping to step (2) to extract zinc;
   (4) taking the chlorine and acid containing raffinate obtained from step (2) as the acidic solution of step (1), returning to step (1) and repeating steps (1)-(4);
   (5) taking out the chlorine and acid containing raffinate obtained from step (4) when chlorine ion of a chlorine-containing aqueous phase in step (2) achieves 50-80 g/L after circulating and repeating steps (1)-(4), wherein the chlorine content of the chlorine and acid containing raffinate taken out is identical to the chlorine content of a chlorine-containing zinc oxide secondary material I added in step (1) so as to keep a balance between an amount of chlorine ion added and an amount of chlorine ion taken out; mixing the chlorine and acid containing raffinate taken out with an additional chlorine-containing zinc oxide secondary material H at liquid-solid ratio of 1-3:1; carrying out liquid-solid separation to obtain a separated deposit; returning the separated deposit to step (1) for leaching with the acidic solution;
   (6) removing impurities of the chlorine-containing aqueous phase to obtain a solution containing KCl and NaCl when step (5) is completed and the solution contains 80-120 g/L of chlorine ion and 160-240 g/L of total salt content; and
   (7) evaporating and concentrating the solution containing KCl and NaCl obtained from step (6) to produce KCl and NaCl products by crystallization.

2. The treatment method of the chlorine-containing zinc oxide secondary material according to claim 1, wherein in step (1), conditions of the leaching are as follows: the leaching liquor is controlled at 25-28 g/L of zinc; the liquid-solid ratio is controlled at 20-40:1; the leaching is implemented in a mechanical stirring tank; and an end pH value of the leaching is 4.5-5.0.

3. The treatment method of the chlorine-containing zinc oxide secondary material according to claim 1, wherein, sulfuric acid serves as the acidic solution for primary leaching in step (1); the sulfuric acid is supplied if the acid from the chlorine and acid containing raffinate of step (4) for the leaching in step (1) is insufficient.

4. The treatment method of the chlorine-containing zinc oxide secondary material according to claim 1, wherein, in step (2), the di-(2-ethylhexyl)phosphoric acid—kerosene solvent is prepared by mixing a di-(2-ethylhexyl)phosphoric acid solvent and a kerosene solvent, and a volume percentage of the di-(2-ethylhexyl)phosphoric acid solvent falls within 20%-40%.

5. The treatment method of the chlorine-containing zinc oxide secondary material according to claim 1, wherein, the recovery of zinc by the stripping and electrolysis in step (3) is carried out by stripping the zinc-containing organic phase with a zinc electrolysis waste solution to provide a stripping solution, wherein the stripping solution contains 100-120 g/L of Zn and 60-100 g/L of $H_2SO_4$, and electrolyzing the stripping solution to obtain zinc after deoiling the stripping solution.

6. The treatment method of the chlorine-containing zinc oxide secondary material according to claim 1, wherein, the mixing in step (5) is carried out in a mechanical stirring tank or in a form of dump leaching; ore pulp is filtered to realize liquid-solid separation when the mixing is carried out in the mechanical stirring tank.

7. The treatment method of the chlorine-containing zinc oxide secondary material according to claim 1, wherein, the impurity removal in step (6) comprises the following steps:
   1) neutralizing and removing heavy metal by adding lime to the chlorine-containing aqueous phase and controlling pH value at 7.0-7.5;
   2) neutralizing and removing Mg adding lime to the chlorine-containing aqueous phase and controlling pH value at 10; and
   3) removing calcium adding $Na_2CO_3$ to the chlorine-containing aqueous phase.

* * * * *